Figure 1:
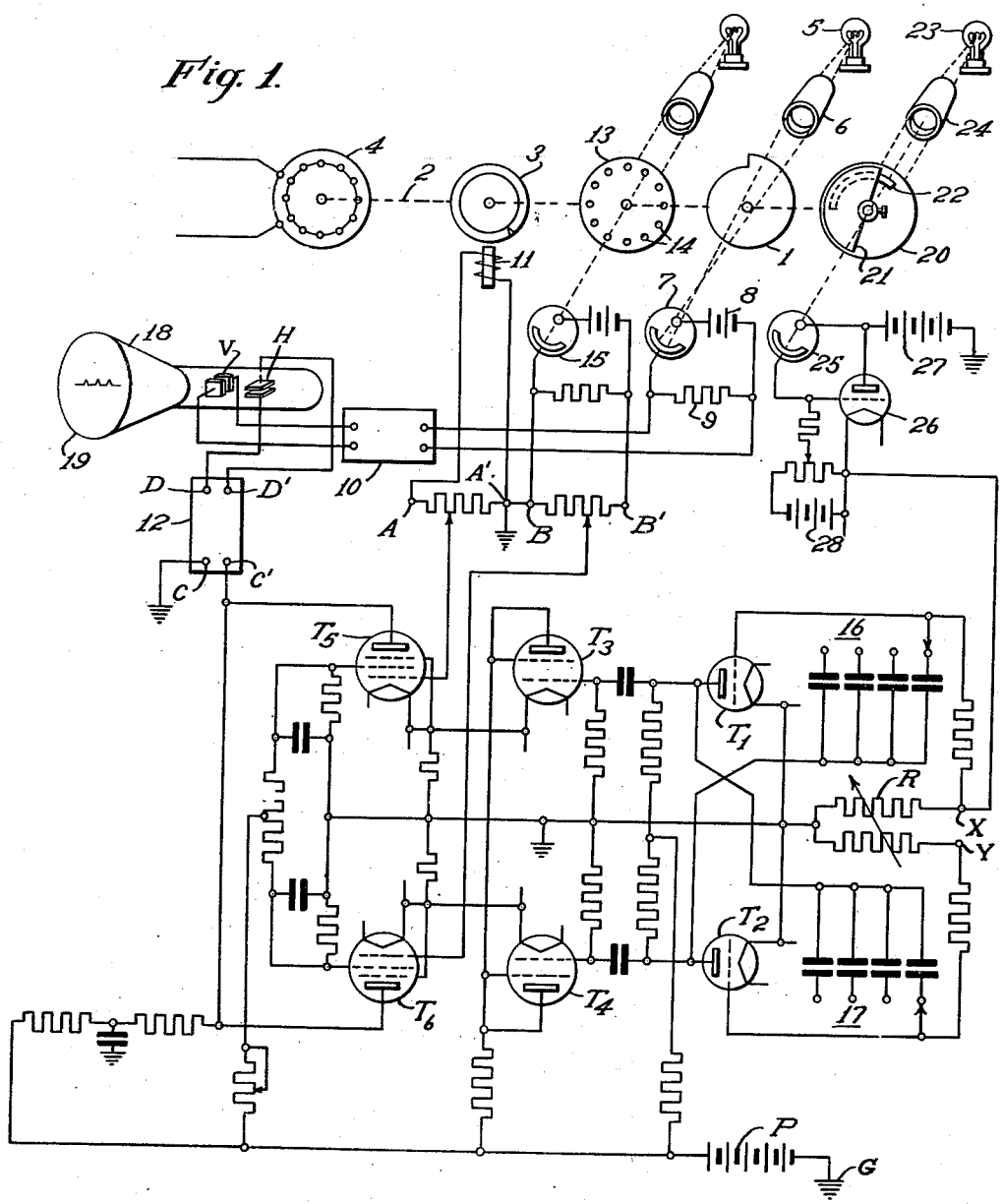

May 23, 1944.    C. S. WILLIAMS    2,349,687
ELECTROMAGNETIC INSPECTION SYSTEM
Filed May 13, 1942

WITNESSES:
Edward Michaels
Wm. La Groove

INVENTOR
Clifton S. Williams
BY
Paul E. Friedemann
ATTORNEY

Patented May 23, 1944

2,349,687

UNITED STATES PATENT OFFICE 2,349,687

ELECTROMAGNETIC-INSPECTION SYSTEM

Clifton S. Williams, Forest Hills, Pa., assignor to Westinghouse Electric & Manufacturing Company, East Pittsburgh, Pa., a corporation of Pennsylvania Application May 13, 1942, Serial No. 442,778

4 Claims. (Cl. 175—183)

My invention relates to an inspection system and, in particular, to one involving a cathode ray indicating device which system is particularly useful for magnetic means for detecting flaws in a test piece or for similar detection of variable quantities in a test piece.

In the method of detecting defects in magnetizable objects as disclosed in an earlier filed patent application of mine, now Patent 2,300,999, and entitled Electromagnetic-inspection systems, and an earlier application of Porter H. Brace and myself, as joint inventors, now Patent 2,221,570, entitled "Electromagnetic-testing system," it is often desirable to accurately locate the position of a defect on a test piece being inspected. In the device disclosed in said earlier filed application, the cathode-ray oscilloscope acting as the detector of defects, has incorporated within itself a so-called "linear sweep" circuit which provides a nominally linear time base which is applied to the oscilloscope deflection plates, thus providing horizontal displacement of the oscilloscope beam at the same time that the characteristics of the piece being inspected are applied to the vertical deflection plates, thus producing the trace characteristic of the piece being inspected. In the device mentioned, the horizontal sweep is correlated with the test piece as it rotates, by an impulse taken from the rotating shaft once each revolution of the test piece. This impulse serves to initiate the sweep, but has no further control until the revolution has been completed. This, then, means that the relationship between position (horizontal) on the trace and posiiton on the piece being tested is definite at only one point, the relationship at all other points being dependent on the control setting, linearity and stability of the sweep circuit.

In the later filed of said earlier applications, this last mentioned defect is corrected but, in practice, it soon became apparent that still other defects should be eliminated.

An object of my invention is to provide a method of continuously controlling the horizontal movement of the oscilloscope beam without any horizontal shifting of corresponding points thereof, thus removing the dependence upon the factors just mentioned with the attendant uncertainties.

Another object of the invention is to provide a cathode ray indicating device which will either visibly indicate or record on a cathode ray tube screen, a film or the like, the variations of magnetic intensity around the periphery of a rotatable test piece together with a non-shifting index curve which together with a non-shifting characteristic curve will denote the exact angular position of a magnetic flaw and the magnetic intensity of such flaw.

Figure 2:
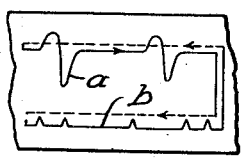
Figure 3:
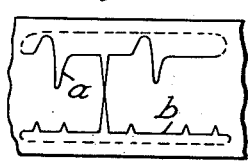

Other objects and advantages will become more apparent from a study of the following specification when considered with the accompanying drawing, in which:

Figure 1 is a schematic showing of an electromagnetic testing device embodying the principles of my invention; and Figs. 2 and 3 indicate either a visual or printed record of two pairs of different curves obtained by the system shown in Fig. 1.

Referring to Figure 1, numeral 1 denotes a cam shaped disc rotating on the shaft 2 (shown dotted) on which is mounted a test piece 3 being inspected and which is mechanically coupled to a driving motor 4 operating at a constant speed. Numeral 5 denotes a light source sending light through the lens 6 (or system of lenses) to fall on the active area of a photocell 7 in quantities which depend upon the angular position of the disc 1. The components of this unit are so set up as to have the cam shaped disc alter the amount of light striking the phototube proportional to its angular movement, thus providing an amount of light falling on the cell which is directly related to angular positions of the piece being inspected, as it is fixed mechanically with respect to the disc.

These quantities of light may then be converted into terms of voltage by a circuit including a battery 8 or other source preferably in the range of 20 to 500 volts and a resistor 9 of a value, preferably between 1 and 100 meghoms, which voltage is then applied to the vertical plates V of the oscilloscope either directly or through an amplifier 10, as shown, thus providing horizontal movement of a beam always controlled by the position of the test shaft.

A detector element 11 which comprises for example, a small core of readily magnetizable material, such as "Hypernik," disposed within a coil, is selectively connected to the horizontal plates H of the cathode ray tube through the amplifier 12 by switching means to be described hereinafter. A second photocell system similar to that described is also connected to the mentioned switching means but which includes a disc 13 having preferably holes 14 instead of a cam shaped member, such as 1.

In previous systems it has been assumed generally that a linear change in voltage applied to the deflection plates would produce linear motion of the electron beam across the face of the oscillograph tube but this is not always true as the deflection plates may not have the same separation from side to side and the deflection constant may differ across the plates or more likely from center to edges. The system illustrated in Fig. 1, can in part provide compensation for these pecularities, as the shape of the controlling cam can be altered to provide any voltage sequence desired. This compensation could be applied to any other distortion initiated in the system as lack of linearity of the phototube, or of the amplifier, if used.

In Figure 1 the optical system is shown with the photocell 7 not at the point of focus for the light source. This provides a condition where the area of phototube element receiving light changes with position of the cam controller. It could be changed so as to place the photocell at the point of focus in which case the feature of receiving light would not change but the intensity of illumination would change with cam position.

I have found that benefit accrues from extension of the photocell principle to the interval marking system as disclosed by P. H. Brace in Patent 2,265,025, entitled "Electromagnetic inspection system." This patent refers to the use of magnetic discontinuities evenly spaced on a wheel mounted on the rotating shaft on which is located the test piece. A pick-up serves to transfer these evenly spaced impulses to the screen in several ways. My photocell system has certain advantages over the magnetic system disclosed in the above copending application in that the "kicks" on the oscilloscope trace are single, one-sided units (see the equal size pointed "kicks" shown with the curves of Figs. 2 and 3) instead of the complete cycle set-up with waves below the horizontal aixs of the curve produced by the magnetic system. Therefore, the indexing feature of such curve is more outstanding since the peaks of the "kicks" serve as reference points. Also by varying the hole size, the width of the "kick" is more easily controlled.

The output from this chopper wheel set-up, that is, the output of photocell 15, according to the form of my invention shown in Fig. 1, makes an impression on a cathode ray screen in the form of reference curve $b$. A reference curve $b$ with points has, therefore, been added to the normal trace curve $a$ obtainable from test piece 3 and detector coil 11. Both characteristics $a$ and $b$ may be photographed on the same film strip. The traces $a$ and $b$ are shown separated for clarity, but may be and usually are superimposed so that $b$ may act as a base line for measurement of vertical excursions of $a$. This I do by two separate exposures, but it has the disadvantage that all factors involved must remain constant over the time required to make two photographic exposures, (about 3–10 seconds). This disadvantage I eliminate by the use of a synchronized "electron switch" which will alternately switch detector 11 and the photocell 15 associated with disc 13 in the circuit and thus change from one trace to the other alternately and at short intervals and, through the persistence of the screen, show both curves $a$ and $b$ simultaneously. The switch mentioned is a device known in the art, such as the conventional "Dumond electron switch—Type 185" illustrated in Fig. 1—hence, a very detailed description of which is deemed unnecessary.

Although the electron switch independent of the combination shown forms, in itself, no part of my present invention, it will be briefly described. The electron switch has two pairs of input terminals indicated as A and A' and B and B'. The two terminals denoted as C and C' are the output terminals and are connected to the amplifier 12 which has its output terminals D and D' connected to the horizontal plates H. Two sets of condensers 16 and 17 are paralleled by triode tubes $T_2$ and $T_1$, respectively. Either or both of these condensers can be charged from power source P if its paralleled tube be non-conductive. Likewise either can be discharged by its associated triode becoming conductive. The circuits of these two sets of associated condensers and triodes are so interconnected as to cause the triode of one to be conductive while the condenser of the other is charging, thus the interconnections provide alternate charging and discharging of condensers 16 and 17. In other words, while a blocking potential is placed on the grid of tube $T_2$, condenser 16 is charged from power source P. After the condenser is fully charged, it will discharge through the anode-cathode circuit of tube $T_2$ and will impress a blocking potential to the grid of tube $T_1$, so as to permit charging of condenser 17. Likewise, as condenser 17 builds up a charge, there will be applied on the grid of tube $T_1$ a blocking potential to make tube $T_1$ non-conductive. In this manner, tubes $T_1$ and $T_2$ become alternately conductive. The rate at which they alternatively become conductive is dependent upon the setting of the variable resistor R; also, of course, on the capacity of condensers 16 and 17 and the voltage of P. Tube $T_1$ controls an amplifier tube $T_3$, while tube $T_2$ controls an amplifier tube $T_4$. Tubes $T_3$ and $T_4$ serve to separate the system components as well as amplify. Tube $T_3$ controls an amplifier tube $T_5$, while tube $T_4$ controls an amplifier tube $T_6$. When tube $T_3$ is conductive, tube $T_5$ is non-conductive and vice versa. Likewise, when tube $T_4$ is conductive, tube $T_6$ is non-conductive and vice versa. In other words, when tube $T_3$ becomes conductive, amplifier tube $T_5$ becomes non-conductive because of the negative potential imposed on the grid of the latter. Likewise, when tube $T_4$ becomes conductive, tube $T_3$ becomes non-conductive. In the final analysis, it will be seen that tubes $T_5$ and $T_6$ become alternately conductive so as to effect switching between input A and A', and input B and B', so that they are alternately inserted in the circuit. In other words, the electron switch has the effect of first introducing circuit means connected across the input terminals B and B'. These circuit means are respectively detector coil 11 and the control circuit of photocell 15, either of which could be connected to the input terminals A and A', while the other is connected to the input terminals B and B'. As stated before, the electron switch per se in Fig. 1 forms no part of my present invention, and is well known in the art, but the combination of its control and the electron switch in combination with the elements shown in Fig. 1 does constitute my present invention. It is understood that other electron switches than the one I do show may be used. The main requirement is that the electronic switching occurs at a high rate of speed, that is, beyond the capability of the human eye to detect and in absolute synchronism with the movement of the test piece so that two phenomena appear to be present at the same time.

The electron switch is a very useful device and by suitable adjustment of resistor R, its frequency of operation can be selected over a wide range. A frequency of operation for this switch can, therefore, be selected to be substantially in synchronism with the rotation of the test piece. But to be "substantially in synchronism" is not enough. There must be absolute synchronism at all the time a given test piece is under observation.

If the voltage of P varies by an amount ever so small or the speed of motor 4 varies by an amount ever so small, the absolute synchronism that may have been obtained by appropriate adjustment of resistor R is gone. Changes in speed of motor 4 and changes in voltage of source P are merely two examples of changes that alter the synchronous arrangement. There are many other factors that destroy any synchronous operation that may have been obtained for a given instant. For example, variations in illumination of certain parts or variations in temperature of any one of the electrical elements of the electron switch, etc., all destroy synchronous operation.

The electron switch thus at no time provides a positive way of synchronizing the switching time with the sweep frequency used in the oscilloscope 18; hence, the beam shifts from one trace to the other at any point on the screen 19, thus introducing a peculiarity on the traces due to the switching which is confusing, to an observer, and gives a very poor appearance for photographing purposes.

The path of the electron beam causing the trace on the screen with the trace from a test piece on one cycle and a reference trace on the other will be as shown in Figs. 2 and 3. In Fig. 2, the transfer of action of the electron beam has taken place at the end of one sweep, and the beginning of another. Hence, the exchange, or cross-over, lines come at one end. The showing in Fig. 3 is for the general case where the transfer may take place at any point along the cycle. The return sweep can be blanked out within the oscilloscope, hence is shown in dotted line in both Figs. 2 and 3. The desirable condition is that shown in Fig. 2 where the cross-over occurs at the end of the sweep where the record must break off and return anyway, hence the introduction of the switching causes no new disturbance provided the cross-over is kept at the ends at all times.

I have found that a voltage impulse introduced between the ground G and either points X or Y (see Fig. 1) causes the tube T1, if the voltage impulse is introduced between point X and the ground G, to break down or discharge, thus initiating the alternations of output signals at any desired point on the oscilloscope sweep. Now, if the rate of the alternations of the electronic switching means is set, by suitable adjustment of resistor R, approximately at the same as the oscilloscope sweep frequency, and the trigger voltage impulse, say, the trigger voltage impulse that may be placed between point X and ground G, is synchronized with the operation of the test piece, then the trigger impulse causes the switching operations of the electronic switching means to remain in absolute synchronism with the sweep and the results shown in Fig. 2 are obtained. The cross-over thus no longer travels back and forth over the screen of the oscilloscope.

To produce this trigger voltage impulse, various means may be used, but I prefer the arrangement presently to be described.

I mount a perforated disc as 20 on shaft 2, which may have one suitably positioned hole, or be of the type shown where an adjustable shield 21 may be used to vary the size of the opening at 22. By means of a source of light 23, and optical system 24, I energize the photocell 25 for a short instant at each revolution. The amplifier tube 26 coupled with sources of electric energy 27 and 28 and the circuit arrangement shown thus produces a trigger voltage impulse between point X and ground G once at each revolution of shaft 2. The trigger impulse is thus synchronized with the sweep frequency and suffices to maintain the operation of the electronic switching means in absolute synchronism with the sweep frequency.

I am, of course, aware that others, particularly after having had the benefit of the teachings of my invention, may devise other devices embodying my invention, and I, therefore, do not wish to be limited to the specific showings made but wish to be limited only by the scope of the appended claims and such prior art that may be pertinent.

I claim as my invention:

1. In an inspection device for indicating the occurrence and locations of irregularities on a test piece, in combination, means for moving the test piece, irregularity detecting means for translating said irregularities into electrical impulses, means including a photocell, a light source and a disc having a plurality of holes along and adjacent its periphery for successively interrupting a beam of light to said photocell from said light source which disc is mechanically coupled to the test piece for creating a series of impulses, electrical detecting means including a cathode ray indicating device having two pairs of deflecting elements at right angles to each other and an electronic switch operated in synchronism with the test piece for periodically and alternately impressing said impulses on a cathode ray screen through one of said pair of electrodes, a light source, a photocell, a cam shaped member mechanically coupled to the test piece for varying the effects of said light source on said photocell and means for converting these effects into voltage variations and for applying said voltage variations to the other pair of deflecting elements to form a sweep circuit for said cathode ray indicating device, a light source, circuit means including a photocell actuated by said light source, a disc mechanically coupled to said test piece having an opening adjacent the periphery thereof adapted to permit the passage of a light beam from said light source to said photocell whereby an electrical impulse is produced with each revolution of said test piece, and means for applying said electrical impulse to said electronic switch for synchronizing the alternate switching thereof, with the electrical impulse produced by said irregularity detecting means.

2. In an inspection device for indicating the values and locations of magnetic properties of a rotatable test piece, in combination, means for rotating the test piece, stationary magnetic pickup means for converting changes of magnetic intensity along the periphery of the test piece into electrical impulses, means including a photocell, a light source and a disc having a plurality of holes along its periphery for successively interrupting a beam of light from said photocell to said light source which disc is mechanically coupled to the test piece for creating a series of impulses, electrical detecting means including a cathode ray indicating device having two pairs of deflecting elements at right angles to each other and switching means for alternately impressing said impulses on a cathode ray screen through one of said pair of deflecting elements, switching control means mechanically coupled to said test piece for initiating switching operation of said switching means in synchronism with rotational movements of said test piece, a light source, a photocell, a cam shaped member mechanically coupled to the test piece for varying the amount of light falling from said light source on said photocell and means for converting these light variations into voltage variations and for applying said voltage variations to the other pair of deflecting elements to form a sweep circuit for said cathode ray indicating device.

3. In an electromagnetic inspection system for inspecting a test piece, in combination, an oscilloscope having conventional horizontal and vertical plates for controlling the beam sweep of the oscilloscope, a rotatable electromagnetic test piece, an electromagnetic flaw detector disposed adjacent the test piece to generate a voltage cycle at each revolution of the test piece indicative of the magnetic characteristics of the test piece, a calibrating generator producing a plurality of sharp voltage impulses at successive equal changes in angular position of the test piece during its rotation, switching means, means coupled to said test piece for producing an electrical impulse upon a predetermined rotational position of said test piece for synchronizing the switching of said switching means with the voltage cycle of said electromagnetic flaw detector, said switching means being operable to connect said electromagnetic flaw detector to said horizontal plates at the end of each odd revolution of the test piece and operable to connect said calibrating generator to said horizontal plates at the end of each even revolution of the test piece, and means coupled to rotative movements of said test piece for producing a saw-tooth voltage impulse and applying said voltage impulse to said vertical plates whereby the horizontal sweep is synchronized with the voltage cycle of said electromagnetic flaw detector.

4. In an electric system for inspecting test pieces for irregularities in their physical characteristics, in combination, means for rotating a test piece, electric energy generating means disposed adjacent the test piece for inspecting the test piece and generating a voltage wave at each revolution of the test piece indicative of the variations of the physical characteristics of the test piece, a second electric energy generating means generating a predetermined number of voltage impulses during each revolution of the test piece each impulse indicating a predetermined angular portion of each revolution, an indicating device, means for alternately connecting the said two generating means to said indicating device, and means mechanically coupled to rotative movements of said test piece for producing a voltage impulse having a predetermined time relationship to said first mentioned generated voltage and applying said voltage impulse to said means for alternately connecting the said two generating means to said indicating device whereby said alternate connecting means is synchronously operated at predetermined intervals with respect to the voltage outputs of said electric energy generating means.

CLIFTON S. WILLIAMS.